G. P. WOOD.
BEEHIVE.
APPLICATION FILED AUG. 17, 1915. RENEWED SEPT. 21, 1916.

1,203,675.

Patented Nov. 7, 1916.
5 SHEETS—SHEET 1.

WITNESSES:
Seymour B. Bimker
Walter L. Underhill

INVENTOR
George P. Wood

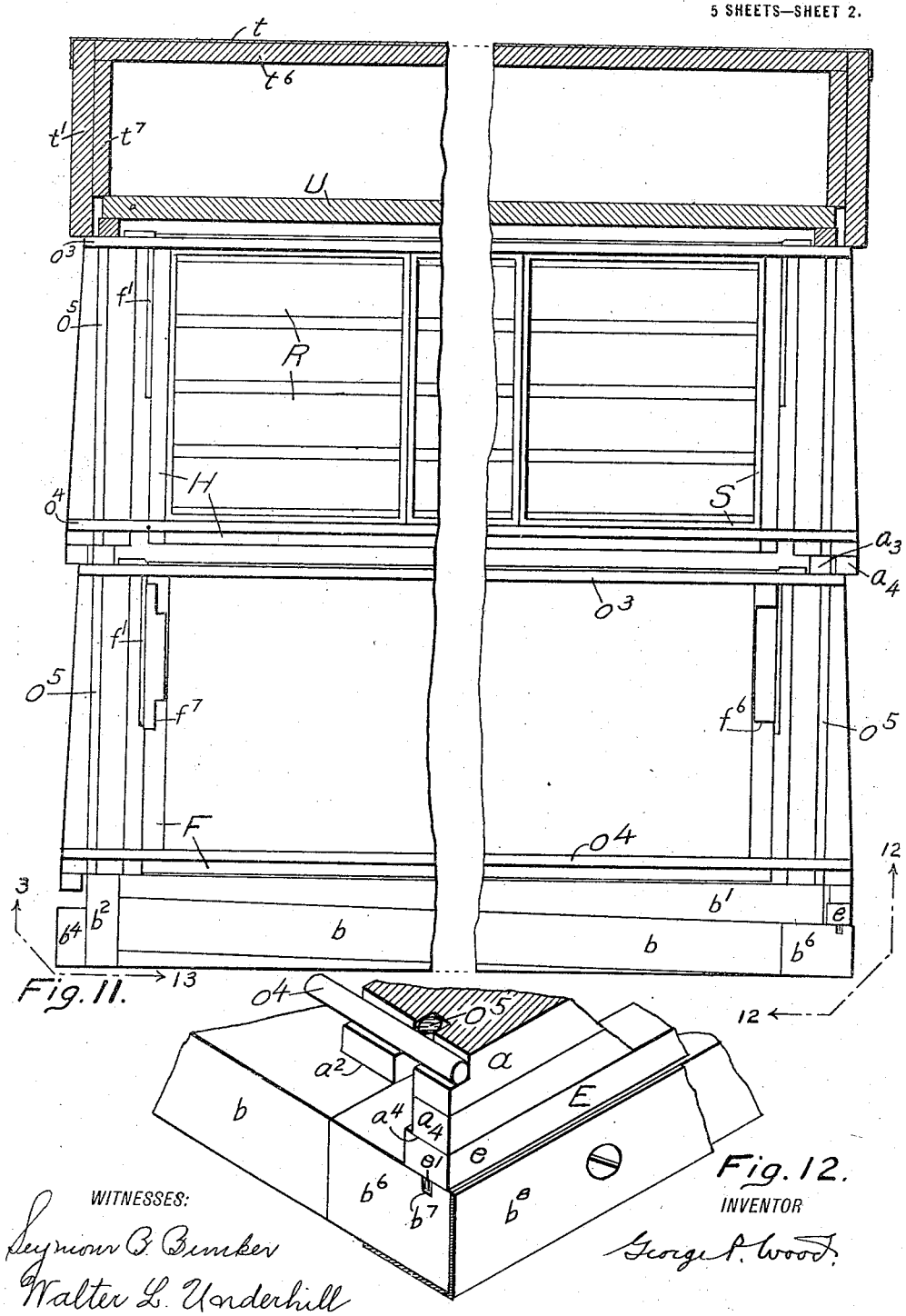

G. P. WOOD.
BEEHIVE.
APPLICATION FILED AUG. 17, 1915. RENEWED SEPT. 21, 1916.

1,203,675.

Patented Nov. 7, 1916.
5 SHEETS—SHEET 3.

WITNESSES:
Seymour B. Brinker
Walter L. Underhill

INVENTOR
George P. Wood

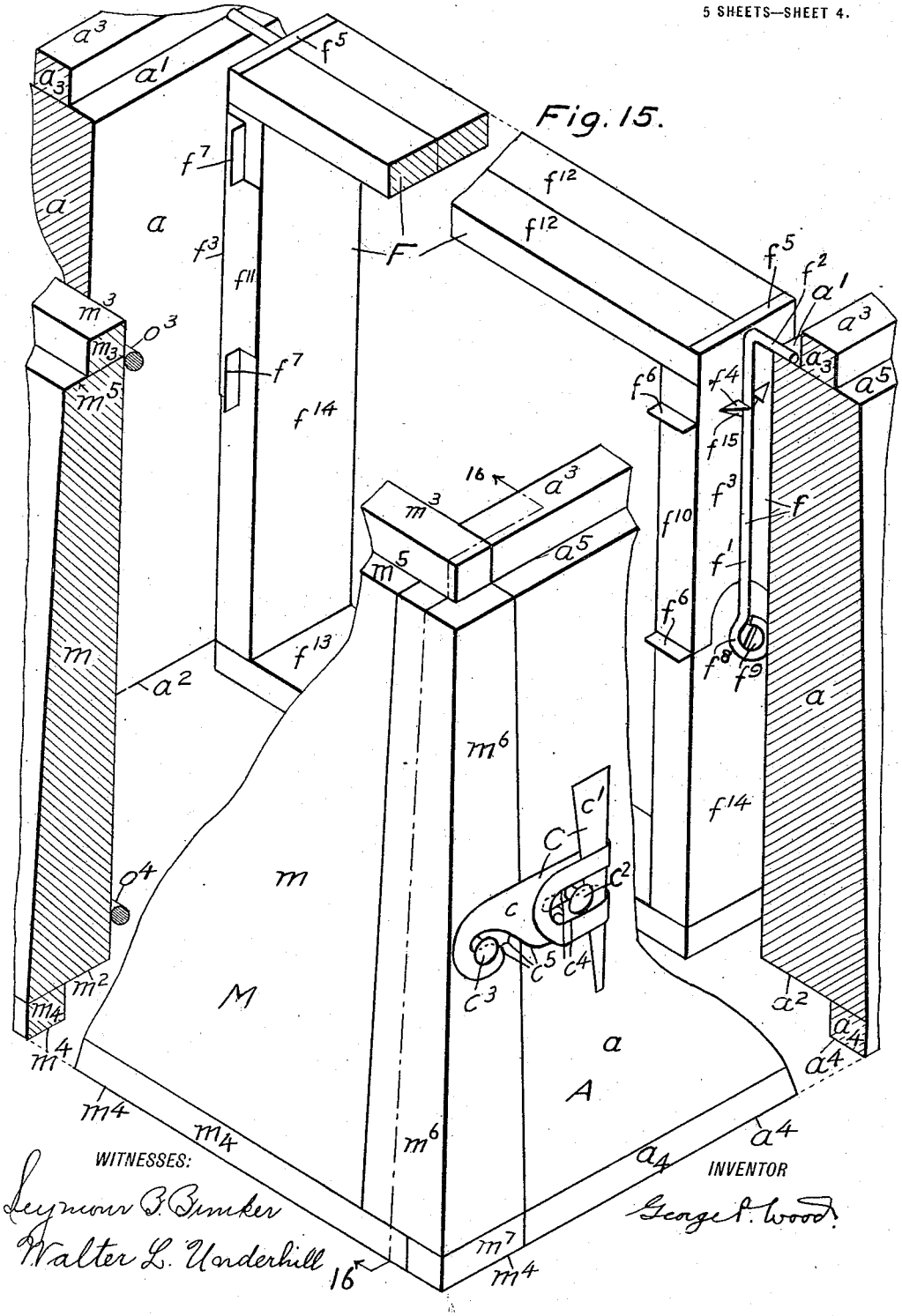

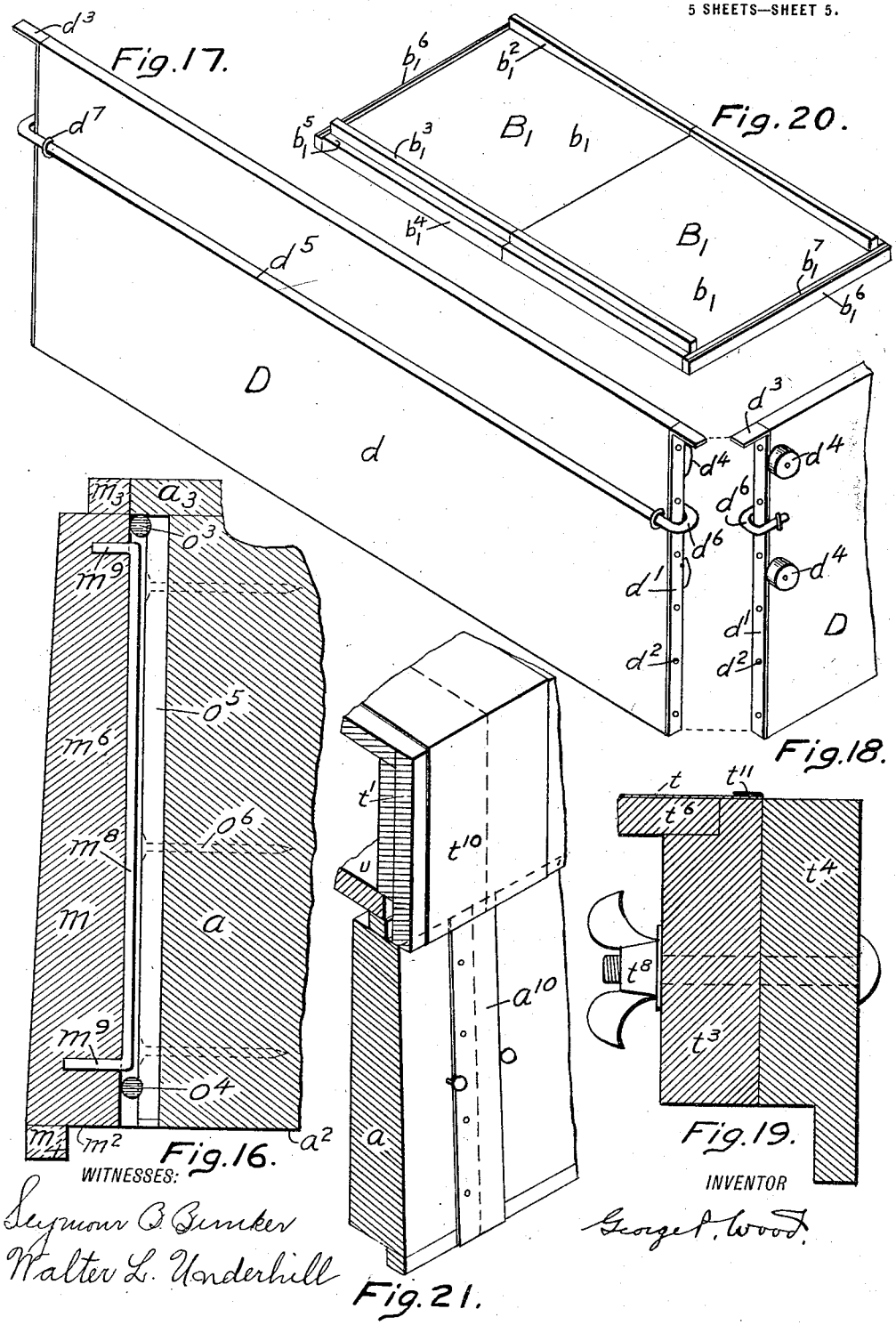

UNITED STATES PATENT OFFICE.

GEORGE P. WOOD, OF PEEKSKILL, NEW YORK.

BEEHIVE.

1,203,675.  Specification of Letters Patent.  Patented Nov. 7, 1916.

Application filed August 17, 1915, Serial No. 45,948. Renewed September 21, 1916. Serial No. 121,522.

*To all whom it may concern:*

Be it known that I, GEORGE P. WOOD, a citizen of the United States, residing at No. 217 Walnut street, in the village of Peekskill, county of Westchester, and State of New York, have invented new and useful Improvements in Beehives, of which the following is a specification.

My invention relates to improvements in the construction of movable-frame sectional beehives of the general type shown and described in my Patent No. 1,068,196, granted July 22, 1913, and in my Patent No. 1,146,044, granted July 13, 1915; each of said patents having for its principal object the construction and use of rectangular movable-frame hive-sections which may individually be complete compartments adapted to be placed one upon another, and in which such provision is made that when one or more detachable walls are removed and they are combined with one or more like hive-sections in one story, bees can pass freely from one to another.

The object of my invention is to manufacture beehives of this type economically, that are strong, thoroughly weatherproof and most adaptable for all requirements of beekeeping. I attain this object by the means illustrated in the accompanying drawings, in which:—

Figure 1:
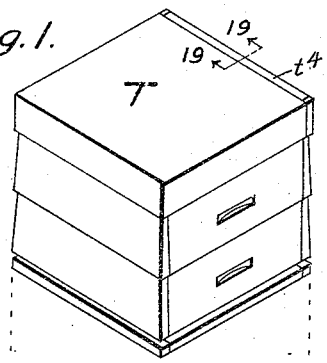
Figure 2:
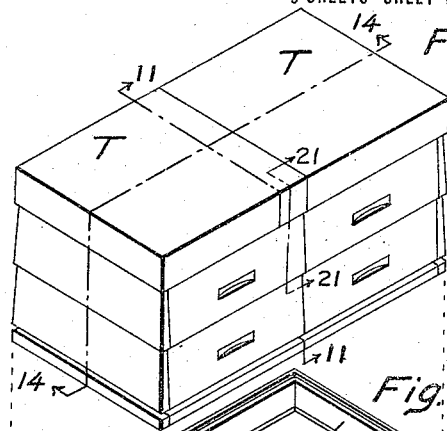
Figure 3:
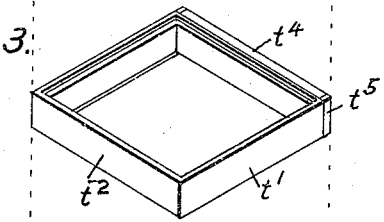
Figure 4:
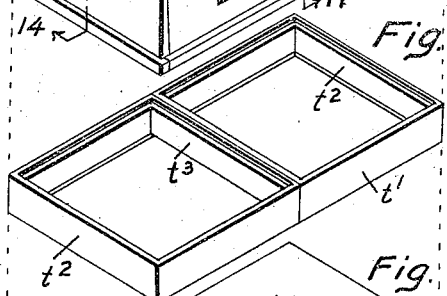
Figure 5:
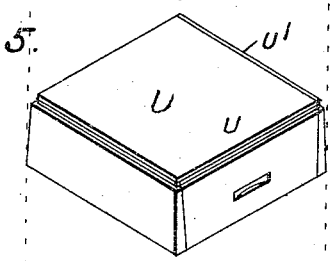
Figure 6:
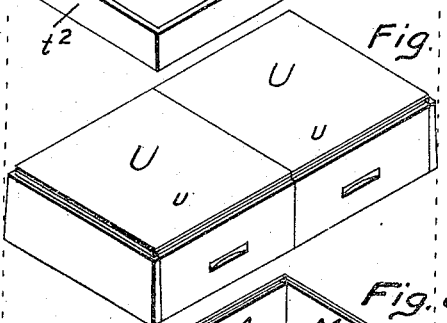
Figure 7:
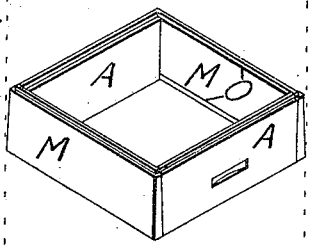
Figure 8:
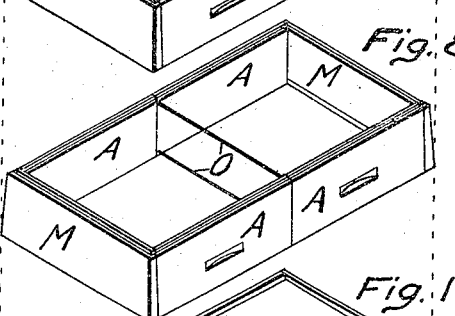
Figure 9:
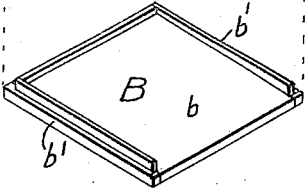
Figure 10:
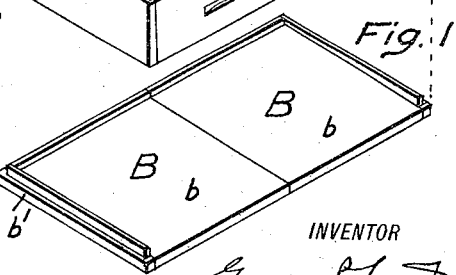
Figure 14:
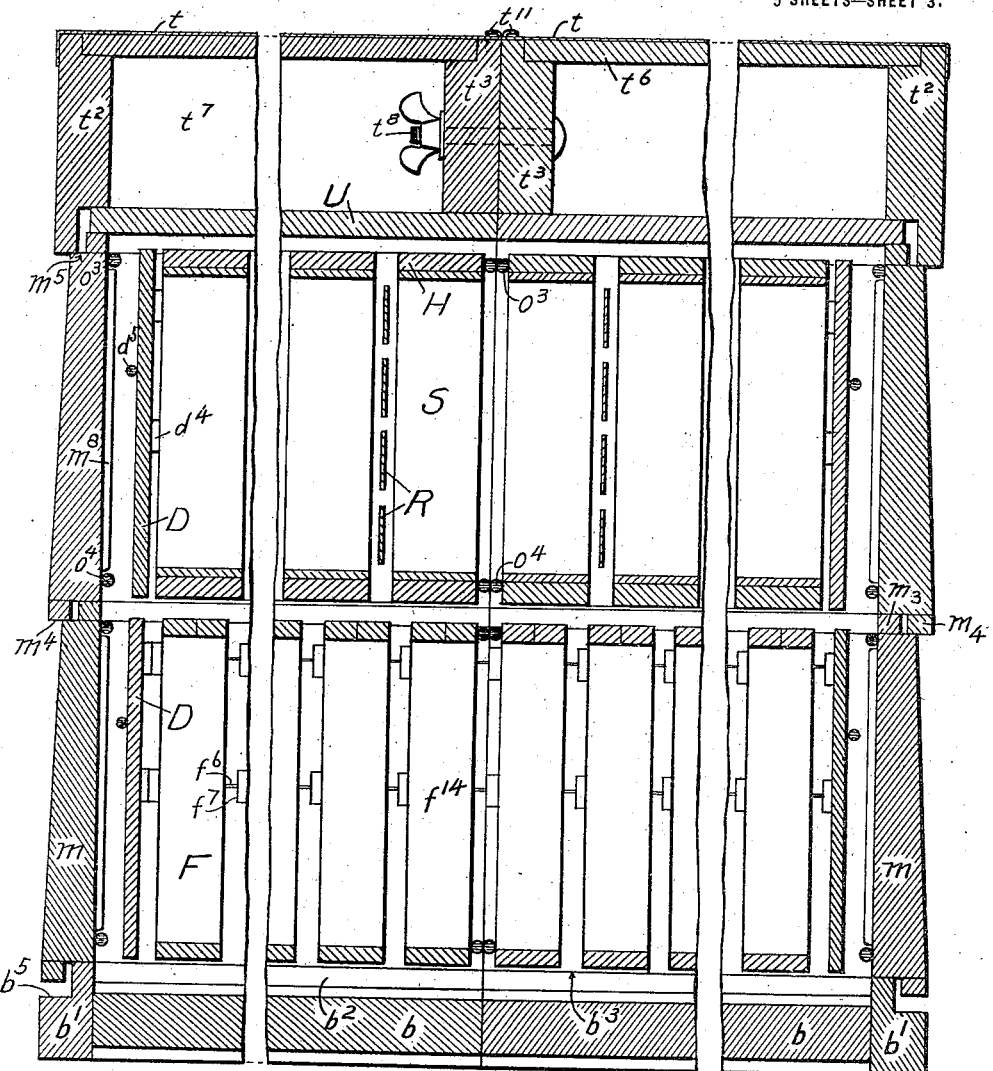
Figure 13:
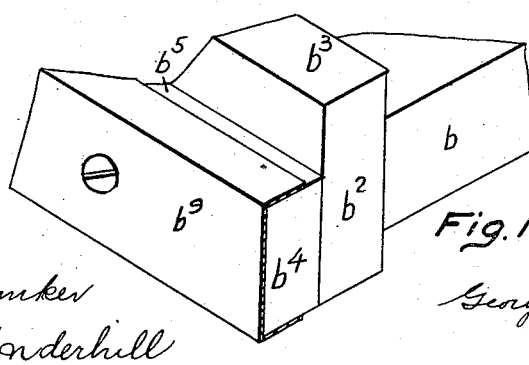

Figure 1 is an isometric drawing of a two-story beehive consisting of a bottom, two hive-sections, an inside-cover and a cover. Fig. 2 is an isometric drawing of a two-story beehive consisting of a combined bottom, four hive-sections, a combined inside-cover and a combined cover. Figs. 3 and 4 are isometric drawings of the single and combined covers shown in Figs. 1 and 2 respectively with the tops removed in order to show the construction of the rims. Figs. 5 and 6 are isometric drawings of the upper hive-sections shown in Figs. 1 and 2 respectively with the single and combined inside-covers in place. Figs. 7 and 8 are isometric drawings of the single and combined lower hive-sections shown in Figs. 1 and 2 respectively. Figs. 9 and 10 are isometric drawings of the single and combined bottoms shown in Figs. 1 and 2 respectively. Fig. 11 is a vertical section of beehive on line 11—11, Fig. 2, to a larger scale but with a portion omitted and showing some of the interior parts. Fig. 12 is an enlarged isometric drawing of detail at 12—12, Fig. 11, and shows a means of securing the component parts of a combined bottom. Fig. 13 is an enlarged isometric drawing of detail at 13—13, Fig. 11, and shows another means of securing the component parts of a combined bottom. Fig. 14 is a vertical section of beehive on line 14—14, Fig. 2, to a larger scale but with portions omitted and shows some of the interior parts. Fig. 15 is an isometric drawing of a hive-section to a large scale but with portions omitted, also showing a means of clamping detachable parts and a means of supporting and spacing movable brood-frames. Fig. 16 is a vertical section on line 16—16, Fig. 15, showing details of construction at corner of hive-section. Figs. 17 and 18 are isometric drawings of a division board and of one end of a division board respectively. Fig. 19 is a vertical section of a cover at 19—19, Fig. 1, to a larger scale. Fig. 20 is an isometric drawing of a combined bottom adapted to provide entrance at opposite edges. Fig. 21 is an isometric drawing at 21—21, Fig. 2, to a larger scale and showing additional special provision for making vertical joints weatherproof.

In these drawings various principal parts are uniformly designated by upper case letters, generally like those designating parts having similar functions in my Patents No. 1,068,196, and No. 1,146,044, as follows: A—complete fixed wall of hive-section. B and $B_1$—bottom. C—clamp. D—division board. E—entrance block. F—movable brood-frame. H—honey-section case. M—detachable wall of hive-section. O—fixed part of hive-section in which open space for the passage of bees through same is provided. R—fence or separator. S—section for comb honey. T—cover. U—inside cover. Details of these parts are uniformly designated by the corresponding lower case letters. Accent or subscript figures are used with the letters where necessary. The names—bottom, hive-section, inside-cover and cover are applied to the respective complete units and also to the units from which the detachable parts have been removed.

Figs. 1 to 10 inclusive are intended to show how the covers, inside-covers, hive-sections and bottoms may be assembled to form beehives of one or two hive-sections per story. Thus by removing the detachable parts $t^4$, $u^1$, M and $b^1$, Figs. 1, 3, 5, 7 and 9, the remaining parts may be placed in juxtaposition with like parts and form the combinations shown in Figs. 2, 4, 6, 8 and 10 respectively. I build bottoms and hive-sections with opposite detachable parts and it is evident any number of these may be combined in a single story. The inside-covers and covers may likewise be built in that manner or each of the units may be made with only one detachable part if desired for combination with only one like part.

I will now proceed to describe the beehive as now built by me which illustrates the invention. The invention is however not limited to this particular construction.

The rectangular movable-frame hive-section illustrated by Figs. 1, 2, 5, 6, 7, 8, 11, 12, 14, 15, 16 and 21 is the principal part of this beehive and consists of two opposite complete walls A, fixed in proper position by connection at ends to two opposite grids O, each composed of rigidly attached horizontal and vertical bars, to form therewith a rectangular compartment having two opposite complete walls and two opposite grids adapted for the passage of bees through same, and also adapted to be closed by detachable walls M, placed outside of the grids and secured at ends to walls A. The grids O, and inside faces of the walls A and M of this hive-section are vertical but the walls are made thickest at the bottom and on account of this increased thickness the bottom of a hive-section projects beyond the top of a like hive-section placed underneath it. By this means and a slightly projecting cover, drip is kept away from the tops of hive-sections to a great extent. In order to economically manufacture the hive-sections in this form I produce the main parts $a$ and $m$, of walls A and M, respectively, by splitting rectangular blocks of lumber on a bevel. The corners of hive-sections are formed by the corner pieces $m^6$ which have their two outside faces beveled to correspond with the parts $a$, and $m$. These corner pieces, which are firmly attached to the parts $m$, as cleats, have a portion $m^7$, projecting below the parts $m$ and $a$, the purpose of which will be explained below. The rabbeted shelves $a^1$, $a^5$, and $m^5$, top edges $a^3$ and $m^3$, rabbeted bases $a^2$ and $m^2$, and bottom edges $a^4$ and $m^4$ are formed by attaching strips $a_3$ and $a_4$ to the parts $a$, and strips $m_3$ and $m_4$ to the parts $m$ as shown. The projecting portions $m^7$ of corner pieces form the continuation and junction of strips $a_4$ and $m_4$. The functions of these shelves, bases and edges are the same as described in my Patent No. 1,068,196 except that the inner portions of bottom edges $a^4$ and $m^4$ are intended to be in contact with and be supported in part by the rabbeted shelves $a^5$ and $m^5$ of another hive-section, when placed over same, instead of a bee-space above these shelves. The result of this change is to make the combinations of hive-sections stronger and more weather-proof due to the double bearing and formation of a small dead-air space between the strips $a_3$ and $a_4$ as shown in Fig. 11, and between strips $m_3$ and $m_4$ as shown in Fig. 14. The wire grids O, are shown in elevation by Fig. 11 and consist of horizontal bars $o^3$ and $o^4$, and vertical bars $o^5$. The horizontal and vertical bars are rigidly connected in the relative positions shown in Fig. 12. They are spaced correctly for insertion in deep vertical and shallow horizontal grooves in the ends of parts $a$, and are secured in position by nails $o^6$ driven alongside the vertical bars into that part as shown in Fig. 16 and described in my Patent No. 1,146,044. The relative position of the bars $o^3$, $o^4$ and $o^5$ with respect to other parts of the beehive is shown by Figs. 7, 8, 11, 12, 14, 15 and 16.

As a means of making the vertical joints between the walls A and M weatherproof and to approximately locate the wall M in its correct position I use a staple-shaped wire $m^8$, Fig. 16, having bent parts $m^9$, driven into the corner pieces $m^6$ in such position that the exposed portion of wire will fit into the vertical groove in the end of part $a$, outside of vertical bar $o^5$, and between horizontal bars $o^3$ and $o^4$, as shown. If it is desired to make the vertical joints between hive-sections or between hive-sections and the detachable walls of same exceptionally weatherproof, I attach projecting metal plates $a^{10}$ to the alternate edges of hive-sections as indicated by Fig. 21 and in the same way to the corresponding alternate edges of detachable walls, in such manner that they overlap the joints in question.

The clamp C, shown in Fig. 15 is an adaptation of my Patent No. 1,136,500 granted April 20, 1915, to the special requirements for rapid manipulation with the hive-section. This consists of the clasp $c$, wedge $c^1$, and catches $c^2$ and $c^3$ attached to the walls A and M to be clamped. The slots $c^4$ and $c^5$ are made of such shape as to facilitate attachment. The action of the wedge between the end of clasp and catch $c^2$ forces the walls A and M together.

The movable brood-frames F, shown in Figs. 11, 14 and 15 are of substantially the same construction as described in my Patents No. 1,068,196 and No. 1,146,044 except as to the means for their support and spacing. Each frame consists of top bars $f^{12}$, bottom bar $f^{13}$, end bars $f^{14}$, and spacer-hangers $f$. These spacer-hangers each consist of a support $f^1$ attached to the end bar of frame, and having its top end $f^2$, bent over away from the frame at the right height to rest upon the supporting shelf $a^1$, and a spacer $f^3$, adapted to slide between the hanger and end of frame and to clasp the latter by means of parts $f^{10}$ and $f^{11}$. This spacer has projections $f^4$ extending outward on either side of and adapted to keep the hanger in the vertical axis of the frame, also an inwardly extending projection $f^5$, at top, adapted to rest upon the top of frame and thereby keep the spacer at the desired height, also projections $f^6$ and $f^7$ at the sides, adapted to engage projections on the spacer-hangers of the adjacent frames and thereby to properly space the frame. I make the hanger of wire, and the lower part of it in the form of a loop $f^8$, and attach it at the vertical and horizontal axes of the frame by a screw $f^9$. I also make the spacer of sheet metal with the projections $f^6$, horizontal, and the projections $f^7$, vertical, as the most practical construction and as shown in the figures; the spacer being pressed against the end of frame by the hanger. The spacer is detached by sliding it up. The frame may then be reversed by turning the hanger 180° upon its pivot. The attachment of the spacer-hanger may be made rigid by means of a staple driven through the openings $f^{15}$, in spacer, and clasping the hanger. Figs. 11 and 14 show the spacer-hangers in relation to other parts of the beehive. The hangers are adapted to support the honey-section cases H, and fences R, and in this beehive as at present used all are of the same length and height and are supported with their tops at substantially the height of the supporting shelves $a^1$, leaving a bee-space between said tops and the elevation of the top edges $a^3$ and $m^3$ of hive-section. This arrangement is desirable if brood-frames and honey-section cases are to be used simultaneously in a hive-section, simplifies the construction of the inside cover and permits the use of the ordinary forms of queen-excluding honey boards if desired.

The division board D, shown in Figs. 14, 17 and 18 is similar to that shown and described in my Patent No. 1,146,044 but contains improvements. It consists of a board $d$, combined cleats and supports $d^1$, each consisting of a metal strap secured to the end of board by nails or similar fastening $d^2$, and having a bent portion $d^3$ adapted to rest upon the shelves $a^1$ of hive-section for the support of the division board, attached projections $d^4$, adapted to engage spacer-hangers of brood-frames or the end bars of honey-section cases, and a division board fastener $d^5$, which consists of a spring of slightly greater length than the distance between the opposite walls of hive-section and having looped ends $d^6$, adapted by roughening or other means to resist sliding along said walls and so shaped as to clasp the division board in a manner to allow some longitudinal motion of the ends of spring. To loosen the division board the middle of spring is raised or otherwise moved out of a straight line. To fasten the division board the spring is released and allowed to straighten and press against the walls of hive-section. No other attachment is required for this fastener than a means of holding it at the desired height which is indicated at $d^7$.

The bottom B, shown in Figs. 1, 2, 9, 10, 11, 12, 13 and 14, each comprises a main board $b$, sloping for proper drainage and to provide an entrance under the bottom edges $a^4$ or $m^4$ of hive-section as shown, two detachable rabbeted cleats $b^1$, which I make of the same thickness as the base of detachable side M, of hive-section, pieces $b^2$ and $b^4$, forming a rabbeted cleat at rear, and a grooved cleat $b^6$; the last two cleats being perpendicular to the grain of the wood in the main board $b$. In addition the combined boards have metal splices $b^8$ or $b^9$. This construction provides for bottoms adapted for any number of hive-sections in one story or a change from one number to another without the expense of new boards. In other respects the bottoms are substantially like those shown and described in my Patent No. 1,068,196. The tops $b^3$, of cleats are adapted to be in contact with the rabbeted bases $a^2$ and $m^2$ for the support of hive-sections and the rabbeted shelves $b^5$ are a bee-space under the bottom edges $a^4$ and $m^4$. Posts or cleats, not shown, support the front wall.

In Fig. 20 is shown a bottom adapted to provide entrances front and rear, in a beehive of two hive-sections in a single story. This is formed by combining two bottoms $B_1$ after removal of detachable parts $b^1{}_1$, each of which bottoms consists of a main board $b_1$, one rabbeted cleat $b^1{}_1$, two rabbeted cleats formed of parts $b^2{}_1$, and $b^4{}_1$ placed perpendicular to the grain of main board $b_1$ and a narrow grooved strip $b^6{}_1$. The rabbeted cleats $b^1{}_1$, referred to but not shown, are of the same cross section as shown in connection with bottom B. This combined bottom is very desirable for the combination of two colonies of bees for wintering; the colonies being separated by a thin diaphragm placed between the adjacent grids of hive-sections.

Figs. 11 and 12 show an adjustable entrance block E, consisting of a simple rectangular piece $e$ adapted to slide longitudinally under the bottom edges $a^4$ or $m^4$ of hive-section, and staples or other small projections $e^1$, extending from the under side of piece $e$ into the groove $b^7$ in bottom; the groove preventing lateral motion of the projections and the entrance block as a whole.

The inside covers U, shown in Figs. 5, 6, 11, 14 and 21, are of usual construction except that they are provided with detachable strips which are removed when two or more hive-sections are combined in a single story. They are adapted to rest upon the top edges $a^3$ and $m^3$ of hive-sections and to support the cover.

The cover T, shown more or less completely in each of Figs. 1, 2, 3, 4, 11, 14, 19 and 21 consists of a rectangular rim formed by rabbeted pieces $t^2$ and $t^3$ connected at ends by pieces $t^1$, a top piece $t^6$ to support the roofing material $t$, fillers $t^7$, and a detachable rim part $t^4$ having cleats $t^5$ attached. I make this detachable part of the same thickness as the detachable parts M and $b^1$ of hive-sections and bottoms respectively so that two covers combined without these parts form a cover for the combination of two hive-sections in one story. I bend the roofing material over upon itself at the edge of part $t^3$ as shown at $t^{11}$ Figs. 14 and 19 as a means of turning the water away from the vertical joint at this place. I have used bolts $t^8$ to combine the covers and to secure the detachable parts in position, but the invention is not limited to that means. The cover is designed to rest upon the inside cover U, and shelves $a^5$ and $m^5$ of hive-sections. This is shown in Figs. 11, 14 and 21. In Fig. 21 is shown an outer covering $t^{10}$, of roofing material designed to overlap the vertical joints between covers or between covers and the detachable parts of same when extra weatherproofing is desired.

Having described my invention, what I claim is:

1. A hive-section comprising two opposite walls, said walls being united at their ends to fixed parts, at right angles thereto, to form a rectangular compartment with vertical walls for containing movable-frames, said fixed parts having an opening or openings whereby the hive-section is adapted for combination with one or more similar hive-sections in one story by having the corresponding fixed parts containing openings placed in juxtaposition in such manner as to provide communicating passages for the bees from one hive-section to another through same, and also adapted for combination with one or more similar hive-sections or combinations of similar hive-sections in more than one story by placing one over another, and detachable walls for the hive-section adapted for connection to form closed walls outside of the fixed parts containing an opening or openings, the main portion of each of the walls being wedge-shaped in cross section with greatest thickness at base whereby the base of hive-section will extend beyond the top of a like hive-section placed under same.

2. A beehive bottom consisting of a main board reinforced and adapted for use with hive-sections by means of cleats at its edges, one cleat or opposite cleats being detachable, whereby the bottom is adapted for combination with other like bottoms to accommodate a beehive of more than one hive-section per story, and means of rigidly uniting said combined bottoms.

3. A beehive cover consisting of a top attached to a rectangular rim adapted for connection to the tops of hive-sections, said rim comprising one or opposite double sides, the outer parts of which are detachable, whereby the cover is adapted for combination with other like covers to accommodate a beehive of more than one hive-section per story, and means of rigidly uniting said combined covers.

4. A beehive comprising one or more bottoms adapted to be combined with like bottoms, one or more hive-sections corresponding to said bottoms and adapted to be combined with like hive-sections and one or more covers corresponding to said bottoms and hive-sections and adapted to be combined with like covers to form a beehive of more than one hive-section or part per story, each bottom, hive-section and cover being also adapted for use in the formation of a complete beehive of one hive-section or part per story by means of corresponding detachable parts adapted to form the outer ends or walls of hive parts when attached and to be omitted when like hive parts are united in one story, and means of fastening.

5. A hive-section comprising two opposite walls, fixed parts each consisting of horizontal and vertical bars and secured at right angles to the ends of said walls to form a rectangular compartment with vertical walls, detachable walls adapted for connection with and to form closed walls outside of the fixed parts, and a locating device for said detachable walls consisting of protruding parts attached to the said detachable walls in the right position to engage vertical grooves in the ends of the side walls of the hive-section between the horizontal bars of the fixed part of the hive-section.

6. In a beehive the combination of the hive wall, a hive bottom containing a longitudinal groove parallel to and directly under the said wall, and a sliding entrance block to occupy the space between the said wall and bottom and containing one or more projections upon its under side adapted to engage the groove and be held in position laterally thereby.

7. In a beehive the combination of a rectangular compartment for containing movable frames, comprising opposite walls and parts at right angles thereto attached to the ends of the walls, a division board, a spring of slightly greater length than the distance between said opposite walls having looped ends adapted for reaction against same and to clasp the division board in such manner as to allow some longitudinal motion of the ends of the spring, means of holding the spring at the desired height and means for supporting and spacing the division board; the said spring being adapted to secure the division board in any desired position in the compartment by allowing the spring to straighten so the ends of same react against the walls and adapted to release the division board by moving the middle part of the spring out of a straight line, thereby shortening the distance between the ends of same.

8. A spacer-hanger consisting of a supporting part adapted to be pivoted to the end bar of a movable frame and to extend upward and then away from said frame so as to rest upon the hive wall and thereby support the frame in combination with a spacing part adapted to slide between the supporting part and the end bar of frame and to clasp the latter and having projections adapted to engage projections on like spacer-hangers of adjacent frames and thereby space the frame.

9. In a beehive the combination of the hive wall provided with a shelf adapted for the support of movable frames, a movable frame with end bar contiguous to said hive wall, a hanger having pivoted attachment at or near the vertical axis of said end bar and extending upward to the supporting shelf and then outward to rest upon same for the support of the frame and a spacing device adapted to slide over the end of the frame between it and the hanger which presses against same and to clasp the frame and outwardly extending projections of the sides of said device adapted to engage projections on the spacers of the adjacent frames and thereby properly space the frame.

10. In a beehive the combination of the hive wall provided with a shelf adapted for the support of movable frames, a movable frame with end bar contiguous to said hive wall, a hanger having pivoted attachment at or near the vertical axis of said end bar and extending upward to the supporting shelf and then outward to rest upon same for the support of the frame and a spacing device adapted to slide over the end of the frame between it and the hanger which presses against same and to clasp the frame and having projections on either side of and adapted to keep the hanger in the vertical axis of the frame and an inwardly extending projection at top adapted to rest upon the top of frame when the spacer is in position, and outwardly extending projections of the sides of said device adapted to engage projections on the spacers of the adjacent frames and thereby properly space the frame.

GEORGE P. WOOD.

Witnesses:
SEYMOUR B. BEMKER,
WALTER L. UNDERHILL.

Copies of this patent may be obtained for five cents each, by addressing the "Commissioner of Patents, Washington, D. C."